Figure 1:
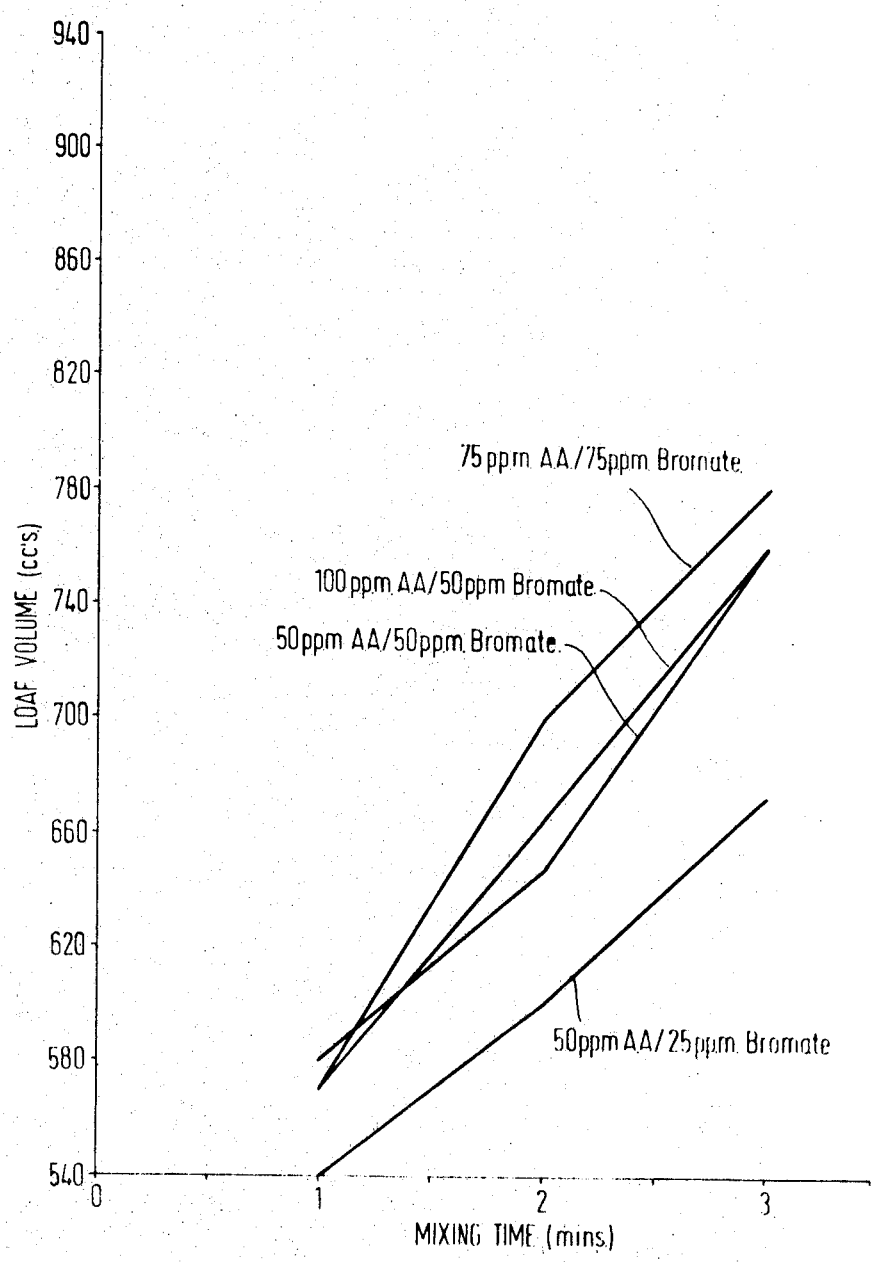

United States Patent

[11] 3,617,305

| [72] | Inventors | Jacques R. Rolland<br>Longueil, Quebec;<br>John Holme, Preville, Quebec, both of Canada |
|---|---|---|
| [21] | Appl. No. | 880,123 |
| [22] | Filed | Nov. 26, 1969 |
| [45] | Patented | Nov. 2, 1971 |
| [73] | Assignee | The Ogilve Flour Mills Company, Limited<br>Montreal, Quebec, Canada |
| [32] | Priority | Nov. 28, 1968 |
| [33] | | Canada |
| [31] | | 036423 |

[54] FLOUR-BASED DRY MIXES FOR HOME BAKING
13 Claims, 9 Drawing Figs.

[52] U.S. Cl. .................................................. 99/91, 99/94
[51] Int. Cl. ............................................ A21d 2/28, A21d 2/22, A21d 2/04
[50] Field of Search ........................................... 99/91, 90, 94; 99/91, 90, 94

[56] References Cited
UNITED STATES PATENTS
3,304,183  2/1967  Johnston et al. .............. 99/90

Primary Examiner—Raymond N. Jones
Assistant Examiner—James R. Hoffman
Attorney—Christen & Sabol ABSTRACT: Flour-based, dry mixes for use in the home preparation of yeast-raised products include an additive composition containing defined amounts of an ascorbate compound, an edible oxidizing agent, and an edible sulfhydryl-containing reducing agent. The additive composition inclusion permits a substantial reduction in the time usually required for the kneading and fermentation steps, and, in certain instances, either one of these two steps may be eliminated. The flour-based, dry mixes facilitate the home preparation of yeast-raised products within much shorter periods of time and more conveniently than hitherto.

FLOUR-BASED DRY MIXES FOR HOME BAKING

The present invention relates to flour-based, dry mixes intended for use in the home for the preparation of home-baked, yeast-raised products such as bread, rolls, buns and the like. More particularly, this invention is concerned with flour-based, dry mixes that can be readily packaged, and to methods of using such mixes in the home for the preparation of home-baked, yeast-raised products. The dry mixes according to this invention contain flour and other conventional ingredients such, for example, as salt, sugar and shortening, together with combinations of functional additives which permit marked improvements in the general convenience of making yeast-raised products in the home.

Presently available dry mixes for the home preparation of yeast-raised products are typically combinations of ingredients normally encountered in commercial bread or roll recipes, and include flour that has received nothing more than normal oxidative treatments. Such mixes must be subjected to the prolonged mixing and kneading steps usually associated with dough preparation. In the process of kneading, which is effected by a rhythmic and regular hand action, the yeast is evenly distributed and the dough developed so as to give a uniformly textured final product. Moreover, the dough so obtained must be allowed to ferment and expand for normal prolonged periods of time, commonly of the order of 2 to 3 hours.

Accordingly, the standard recipes for the preparation of bread or the like in the home call for much tedious and rather skilful hand kneading of the dough, usually for 15 to 30 minutes, and require a lengthy fermentation period during which the dough is set aside to rise and to develop certain characteristics that are essential for the obtainment of an acceptable final product. By way of illustration, the recipe provided with a typical commercially available bread mix for home usage suggests a mixing time of around 3 to 4 minutes, a kneading time of 10 to 20 minutes and a fermentation period of about 2½ hours, so that the overall preparation time is around 3½ hours to 4 hours. The preparation of home made, yeast-raised products like bread using the dry mixes available at the present time is, therefore, a time-consuming, tedious and inconvenient operation which no doubt explains, at least in part, the marked decline in the home baking of bread and like products.

In contrast to home baking processes, in which there has been, at best, only a scant effort in recent years to improve and simplify the procedures involved, much study has been devoted to commercial breadmaking procedures in seeking to shorten the overall time of bread preparation and reduce the number and inconvenience of operating steps. In certain of these commercial practices, some involving conventional mixing equipment and others employing new high-speed mechanical devices, chemical treatments based on various types of additives are utilized. For instance, high levels of oxidants such as bromate and/or iodate salts, are often employed to allow satisfactory bread production in shortened times, and in certain instances decreases in mixing requirements have been claimed by use of high levels of ascorbic acid on the one hand, and L-cysteine hydrochloride on the other.

Normal commercial preparation of bread is, as are most commercial production operations, becoming highly automated and strictly controlled in process terms. Successful long term production requires stringent control of bread characteristics and loaf quality. Variations in volume, appearance, eating quality and keeping quality are not tolerable except in very minor degrees. In order to obtain such standardization very close control of ingredient quality and performance characteristics, of the times, temperatures, and work inputs in preparation procedures, and in shaping, proofing and baking procedures are demanded.

It will be readily appreciated by one skilled in the art that the hand preparation of bread in the home is not such a well-controlled procedure, nor are the results of home baking so characterized by uniformity in terms of volume, shape, grain and texture. A diversity of actual practices in handling, mixing, fermenting, shaping and proofing of bread in home preparation procedures are encountered, all of which provide obstacles to proper control of bread characteristics, and hence demand from the composition, performance characteristics in many ways more stringent than those required in commercial practice.

The applicants, therefore, have recognized that commercial and home baking processes are not at all alike, and the specialized equipment, control procedures and chemical treatments applicable to, and associated with, commercial practices are not directly pertinent to the home baking process nor relatable to it in terms of its demand for skilful control of each preparative step. Hence, applicants realized that novel approaches to the home baking process would most likely come through a detailed investigation of the process itself and not by reference to the procedures of commercial processes.

It is a general object of this invention to provide methods for facilitating the preparation of yeast-raised products in the home within substantially shorter periods of time and with greater convenience than hitherto.

It is also an object of the invention to provide flour-based, dry mixes incorporating normal bread, roll or like ingredients and additive combinations, which enable the simplified and convenient home preparation of yeast-raised products.

The fulfilment of these and other related ends is based on applicants' finding of the unique contributions made to, and effects resulting from the presence in, flour-based, dry mixes for use in the home preparation of yeast-raised products, of an additive composition comprising defined amounts of an ascorbate compound such, for example, as ascorbic acid, an edible oxidizing agent such, for example, as an alkali or alkaline earth bromate or iodate and an edible sulfhydryl (SH)-containing reducing agent such, for example, as L-cysteine hydrochloride.

The amounts of each additive that must be employed in combined use in order to obtain the desired results are generally found to be within the following ranges (based on flour weight):

| | |
|---|---|
| Ascorbates such as ascorbic acid | 20 to 100 p.p.m. |
| Oxidants such as potassium bromate | 20 to 75 p.p.m. |
| Reducing agents such as L-cysteine hydrochloride | 15 to 100 p.p.m. |

The preferred ranges are usually within the following limits, again based on flour weight:

| | |
|---|---|
| Ascorbates such as ascorbic acid | 25 to 75 p.p.m. |
| Oxidants such as potassium bromate | 25 to 65 p.p.m. |
| Reducing agents such as L-cysteine hydrochloride | 40 to 90 p.p.m. |

Optimum levels for each of the components of the additive composition will vary depending, for instance, upon flour strength and the nature and amount of the other components, and more information regarding this aspect is presented in examples given herein.

Accordingly, in one of its aspects, this invention provides a blended, packageable dry mix adapted to be mixed with water and yeast and made into home-baked, yeast-raised products comprising a homogeneous blend of flour, sugar, shortening, salt and an additive composition containing, in parts per million based on flour weight, 20 to 100 parts of an ascorbate compound such as ascorbic acid, 20 to 75 parts of an edible oxidizing agent such as potassium bromate and 15 to 100 parts of an edible sulfhydryl-containing reducing agent such as L-cysteine hydrochloride. Conveniently, the dry mix also includes milk solids such as nonfat dry milk or skim milk.

A preferred blended, packageable dry mix according to this invention comprises a homogeneous blend including about 70 to about 90 percent by weight flour, about 2 to about 10 percent sugar, about 1 to about 3 percent salt, 0 to about 8 percent shortening, the equivalent of 0 to about 5 percent milk solids (all percentages based on flour weight), and an additive composition containing, in parts per million based on flour weight, 25 to 75 parts of an ascorbate compound such as ascorbic acid, 25 to 65 parts of an edible oxidizing agent such as potassium bromate and 40 to 90 parts of an edible sulfhydryl-containing reducing agent such as L-cysteine hydrochloride.

The invention, in another of its aspects, provides a method of making home-baked products from yeast-raised doughs which comprises adding a liquid suspension of yeast to a mix comprising flour, sugar, shortening, salt, conveniently milk solids, and an additive composition containing, in parts per million based on flour weight, 20 to 100 parts of an ascorbate compound such as ascorbic acid, 20 to 75 parts of an edible oxidizing agent such as potassium bromate and 15 to 100 parts of an edible sulfhydryl-containing reducing agent such as L-cysteine hydrochloride, blending the yeast suspension and the mix to form a dough mass, kneading the dough for up to about 8 minutes and/or fermenting the dough for up to about 60 minutes, thereafter forming the dough into loaves and proofing and baking the loaves.

In one home baking procedure according to this invention, the dough, either without any kneading whatever or with only a relatively short period, for instance, about 1 to 4 minutes of kneading, is allowed to ferment for about 15 to about 60 minutes, for instance, about 30 minutes. In an alternative procedure, the dough is kneaded for a longer period, for instance, from about 4 to about 8 minutes, which permits fermentation to be omitted entirely as a distinct process step.

Regardless of the procedure employed, the home baking method of this invention enables the overall preparation time to be substantially reduced compared to prior practice, typically from the 3½ to 4 hours or more hitherto required to around 2 hours.

The additive composition may be blended with the flour, say, at the flour mill, prior to the incorporation of the conventional baking ingredients, or it may be added to, and intimately mixed with, a blend of the flour and the conventional baking ingredients.

The preferred ascorbate compound is L-ascorbic acid; the preferred edible oxidizing agent is potassium bromate; and the preferred edible sulfhydryl-containing reducing agent is L-cysteine hydrochloride; and, for convenience, the following description will refer mainly to combinations of these three compounds. However, other ascorbates, such, for example, as calcium ascorbate and sodium ascorbate, other oxidizing agents such, for example, as sodium bromate, calcium bromate, sodium iodate, potassium iodate, calcium iodate and chlorine dioxide, and other sulfhydryl-containing reducing agents such, for example, as glutathione and bisulfites like sodium metabisulfite may be used.

Each of the components of the additive composition alone is well recognized as a flour treatment reagent for providing oxidative or reductive effects in commercial bread dough preparations. Thus, potassium bromate is a common flour-improving agent, and in situations where doughs obtain adequate machine mixing and long fermentation times it is known to provide very significant improvements in loaf characteristics, such as volume, grain, and texture. However, potassium bromate is also known to contribute certain deficiencies to normal commercial baking procedures since it is slow acting, and hence requires very thorough mixing and lengthy fermentation periods in order to function effectively. Ascorbic acid has also been recognized as a flour improver, but only recently has it been examined in procedures claiming to provide shorter mixing times. L-cysteine hydrochloride, a naturally occurring amino acid containing free sulfhydryl groups, and hence active as a reducing agent in proteinaceous systems such as those comprising in part the protein of wheat, has long been known to have adverse effects on bread volume and structure, when incorporated into standard machine-mixed bread doughs. For this reason, and also because of difficulties in controlling the effects of its reducing action during mixing or fermentation and proofing times of normal duration, L-cysteine hydrochloride has not received general acceptance as a bread improver. All three additive components, therefore, have previously been suggested for, or actually employed with varying degrees of success in, commercial bread production. However, the information relating to their use in commercial practice is inconclusive and not at all pertinent to home baking processes, in which the dough receives only minimal mixing and kneading in contrast to commercial baking processes, especially where it is given only a relatively short fermentation time.

For instance, as previously mentioned, high levels of an oxidant such as bromate salts have been utilized in short-time commercial baking processes. We have found, however, that such levels of these oxidants when used in home bread recipes involving shortened times of fermentation do not perform satisfactorily, primarily for two reasons, Firstly, the effective action of the bromate depends upon very complete mixing and dough development, achieved very readily commercially in conventional or high-speed dough-mixing machinery. The positive effects of bromate are not seen in doughs which are subjected to the minimal times of mixing and development normally encountered in home baking procedures. Secondly, since bromate is a slow-acting oxidant, the improvement in volume, structure and grain normally associated with its use in commercial practice, is achieved only after fermentation times in excess of those which could be said to significantly decrease total preparation time.

As stated above, bromate is a slow-acting flour improver. It is also now known that the response to bromate is very dependent on the time and other conditions of fermentation. Hence, in home baking procedures it is not tolerant to the many varied conditions which are normally encountered therein, but which are normally absent from commercial baking processes. For example, with added bromate alone marked effects in volume are seen over small differences in fermentation time and temperature, such effects being unsuitable for application to home baking procedures, particularly those of this invention in which doughs do not receive more than minimal mixing and short fermentation periods.

Applicants have found that mixtures of potassium bromate and ascorbic acid do allow improved tolerance to variations in fermentation time and permit the preparation of bread in shortened times but only in those situations in which dough is well mixed and developed by commercial bread-mixing equipment. Prior art references to the use of ascorbic acid alone, and also combinations of potassium bromate and L-cysteine hydrochloride, also clearly indicate the need for thorough mechanical mixing for times of about 10 minutes or more. We have found such information to be nonapplicable to home baking procedures because of the specified requirement for good mixing over a relatively long period to elicit the beneficial effects of the additives.

The increased tolerance to fermentation times and fermentation temperatures conferred upon doughs by combinations of ascorbic acid and potassium bromate is illustrated in example 1 hereinafter. Such additive mixtures, although providing good results in doughs which receive adequate mixing as is obtained with commercial equipment, are not sufficient for preparation of satisfactory homemade bread in short-time procedures. Adequate response to conditions of minimal mixing, such as those used in the home, and maintenance of tolerance to domestic fermentation conditions, have been found possible only with properly selected mixtures of ascorbate compounds such as ascorbic acid, edible oxidizing agents such as potassium bromate and a reducing agent such as L-cysteine hydrochloride or glutathione or bisulfite salts present in defined amounts.

Essentially all types of wheat flours have been found suitable for preparation of home-baked, yeast-raised products by the procedures of this invention. Normal "white" flours, obtained from conventional flour-milling procedures and designated as Low Grade, Clear, Straight or Patent, are all suitable farinaceous bases for prepared dry mixes according to this invention. Similarly, flours varying in protein content, and hence "strength," from 10 to 17 percent protein, are suitable. Similarly, whole wheat flours, representing 90 percent or more of the total wheat kernel composition are suitable, and yield excellent whole wheat breads under short fermentation time conditions. Mixtures of such flours as above have also been examined, and all respond well, in the home baking processes, to the functional additive compositions employed.

The following examples are given by way of facilitating a more comprehensive understanding of this invention, and to demonstrate the advances made over present home baking procedures, and the possibilities of producing dry, packageable mixes for the home preparation of yeast-raised products.

Figure 2:
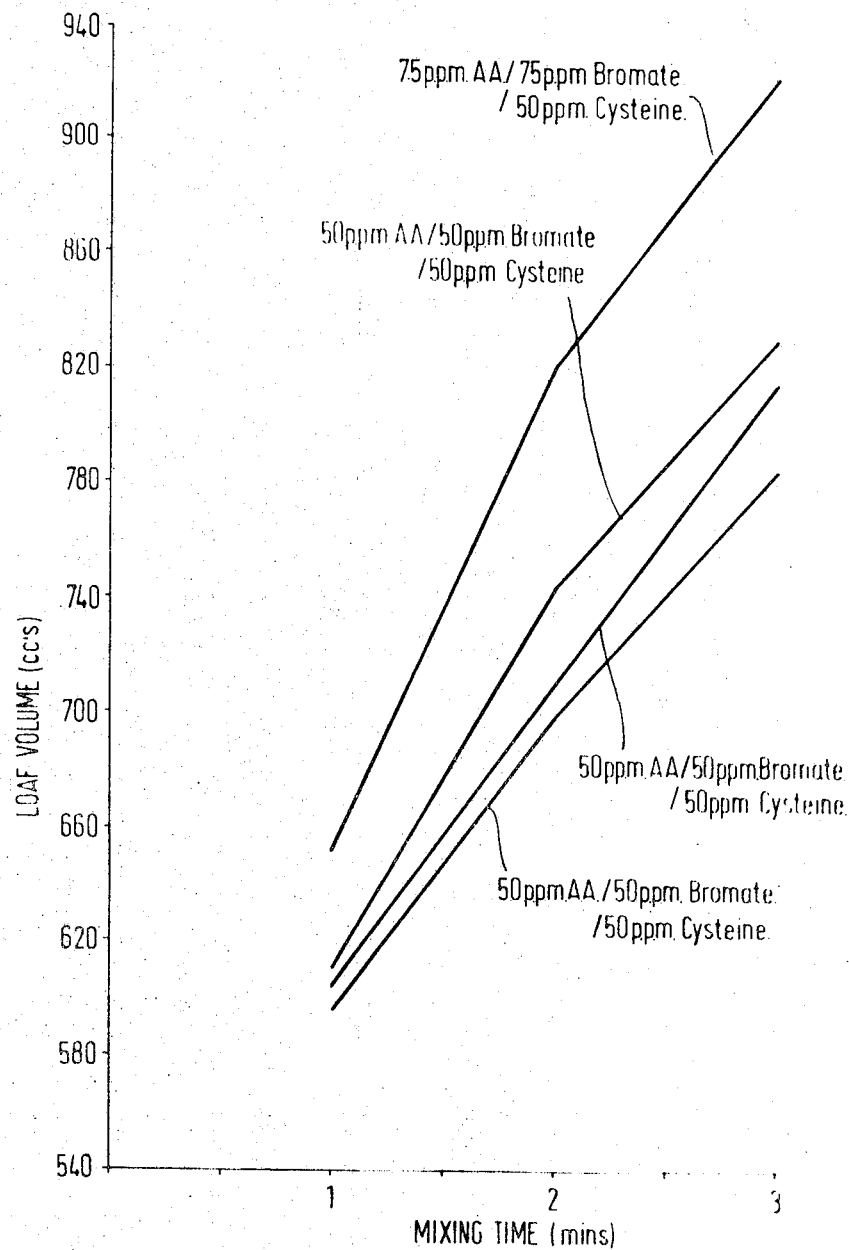

In some of these examples, reference will be made to the accompanying drawings, in which:

FIGS. 1 and 2 are graphs showing loaf volume as a function of mixing time for different dough systems; and FIGS. 3A to G are photographs, without magnification, both of loaves prepared according to the invention and of loaves not so made included for comparative purposes.

EXAMPLE 1

Effect of Mixing Time on Response of Bread to Particular Additive Combinations

Part A

The Remit baking formula of the Grain Research Laboratory, Winnipeg was employed to prepare "pup" loaves (140 gm.) of white bread:

| Ingredient | Content (g.) |
|---|---|
| Flour* | 300.0 |
| Compressed yeast | 9.0 |
| Sucrose | 7.5 |
| Common salt | 3.0 |
| Malt syrup (250 Lintner) | 0.9 |
| Ammonium dihydrogen phosphate | 0.3 |
| Water | 168 |

*The flour grade was equal to Top Patent flour—12.4% protein, 0.36% ash.

The flour had been treated with:

| Ascorbic acid | 50 p.p.m. |
|---|---|
| Potassium bromate | 25 p.p.m. |

Procedure

The procedure employed was a straight dough method, and doughs were mixed for varying specified times in a Brabender Farinograph Mixing bowl operating at standard mixing speed (62 r.p.m.) The doughs were divided into three portions immediately after mixing, so that triplicate pup loaves were obtained for each run. The doughs were then fermented for 30 minutes at 90° F., prior to shaping, proofing for 60 minutes at 90° F. and baking at 400° F. for 30 minutes. In each instance, the volume of the baked loaves was measured by rapeseed displacement. The results, shown in the table below, indicate clearly the importance of proper machine mixing to the actual performance of the oxidative treatment.

TABLE I

| Mixing Time | Loaf Volume |
|---|---|
| 1 min. | 540 cc. |
| 2 min. | 600 cc. |
| 3 min. | 673 cc. |
| 4 min. | 770 cc. |
| 5 min. | 780 cc. |
| 6 min. | 770 cc. |

The data presented in the table show that a mixing time of about 5 minutes gives optimum development. Close observation of the degree of mixing and the extent of dough development resulting from the Farinograph, and comparison with typical hand kneading procedures indicates that normal home hand kneading corresponds to around the 1- or 2-minute point in terms of equivalence to the dough development obtained on the Farinograph, These results, then, indicate that normal hand kneading alone cannot achieve enough dough development to elicit the improving effect associated with ascorbic acid and potassium bromate in machine mixing, in a short fermentation time baking process.

Part B

The basic procedure of part A was repeated except that higher levels of ascorbic acid and potassium bromate (50 p.p.m. of each: 75 p.p.m. of each: 100 p.p.m. ascorbic acid and 50 p.p.m. potassium bromate) were used in three sets of experiments to determine whether, at these higher levels, adequate dough development, as achieved by machine mixing, is a prerequisite to the improving action of the ascorbic acid-potassium bromate combination. The graph reproduced as FIG. 1 of the accompanying drawings shows the relationship between loaf volume and mixing time, and verifies that there is a definite correlation between dough-mixing time and the improving effect (as reflected in loaf volume), with the latter being more pronounced, over the mixing times studies, with increasing mixing time.

Part C

The basic procedure of part A was repeated except that in this instance the flour was treated in one set of experiments with 50 p.p.m. ascorbic acid, 50 p.p.m. potassium bromate and different levels of L-cysteine hydrochloride and, in another set of experiments with 75 p.p.m. ascorbic acid, 75 p.p.m. potassium bromate and 50 p.p.m. L-cysteine hydrochloride, and the doughs were mixed for periods of 1,2 or 3 minutes. The graph reproduced as FIG. 2 of the accompanying drawings shows the relationship between loaf volume and mixing time for the two sets of experiments. From the graph, it can be seen that at the given ascorbic acid/bromate level (50 p.p.m. of each), increasing levels of cysteine provide a greater response in loaf volume. Also, at a give level of cysteine (50 p.p.m.) increasing levels of ascorbic acid/bromate are now more responsive, giving markedly improved loaf volumes at all mixing times. Moreover, by comparing the graph of FIG. 2 with that of FIG. 1, it can be seen that the cysteine, in accelerating the dough development, reduces the mixing requirements associated with a proper degree of development so that, even under the low mixing conditions, (1-minute mixing time), comparable to those prevailing in hand kneading, the loaf volume is still satisfactory.

EXAMPLE 2

Conventional Bread Mix

Figure 3A:
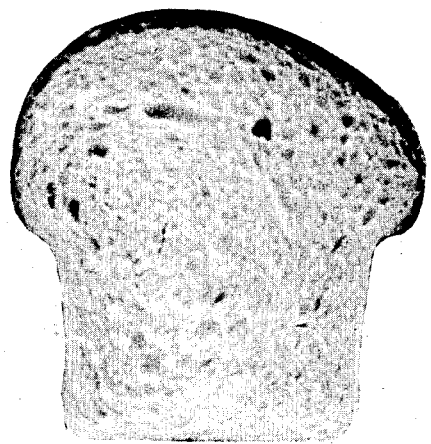

A commercially available dry mix for the preparation of bread in the home serves to act as control and to illustrate the nature of the contemporary art. This dry mix contains flour which has received conventional levels of oxidative treatment so that prolonged hand mixing, kneading and fermentation is required for satisfactory results. The bread was prepared according to the recommended procedure on the package. Total mixing and kneading time was 13 minutes, the fermentation time was 2½ hours, and total preparation time was 3 hours and 40 minutes. The bread obtained was of good appearance, structure and eating qualities but had a rather low specific volume, a measure of the "lightness" of the bread, of 3.6 cc./g. A cross section of the loaf resulting from this procedure is shown in the photograph of FIG. 3A in the accompanying drawings.

EXAMPLE 3

Part A

White Bread Mix

A prepared dry mix of the following formulation is a preferred mix according to this invention for the preparation of white bread.

Formula

| Ingredient | Content (g.) |
| --- | --- |
| Flour* | 100 |
| Shortening | 3 |
| Sugar | 5 |
| Salt | 2.5 |
| Skim milk powder | 2 |
| Ascorbic acid | 50 p.p.m. |
| Potassium bromate | 50 p.p.m. |
| L-Cysteine hydrochloride | 75 p.p.m. |
| Active dry yeast** | 6 g. per loaf |

*The flour grade was equal to Top Patent flour—12.4% protein, 0.36% ash.

**The yeast was packaged separately.

Procedure

Bread was prepared from this dry mix by a procedure which involved only 1-minute kneading. The yeast was dissolved in ¼-cup warm water (105°–115° F.) along with 1 teaspoon sugar. This was set aside to stand for 15 minutes. The dissolved yeast was then mixed into 1¼ cups lukewarm water. The dry mix (14 oz.) was simply added to the water containing the dissolved yeast, and the dough stirred with a spoon until a fairly uniformly wetted dough ball was obtained. This dough ball was kneaded for 1 minute, after which it was subjected to 30 minutes' fermentation in a humid oven at 85° F., followed by removal of the dough from the bowl, and shaping into loaves by normal procedures. The loaves were proofed for 45 minutes at 85° to 100° F. prior to baking at 400° F. for 35 minutes.

Figure 3B:
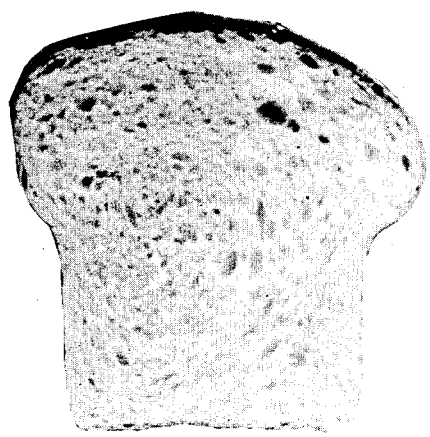

The resulting loaf had a specific volume of 4.7, was excellent in shape and appearance, and very mature in texture. It had a very acceptable flavor and aroma. A cross section of the loaf illustrating the regular and uniform texture is shown in the photograph of FIG. 3B in the accompanying drawings.

Part B

Comparative Experiment

Figure 3C:
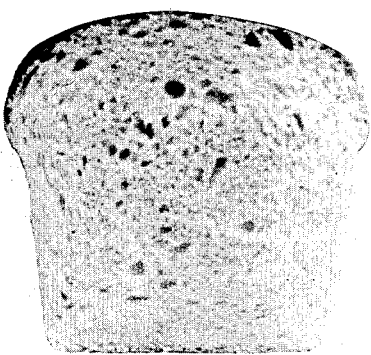

The conventional commercially available dry bread mix of example 2 herein was processed following exactly the same procedure, i.e. 1-minute kneading and 30 minutes' fermentation, used in part A of this example. The resulting loaf was of very small volume, irregular shape, no shred, had thick cell walls and was clearly immature. Such a loaf would be unacceptable to the housewife. A cross section of the loaf illustrating the coarse texture is shown in the photograph of FIG. 3C in the accompanying drawings. Hence, the simplified, convenient and shortened home baking procedures used with the dry mixes of this invention, are not applicable to a commercial bread mix as presently available.

Part C

Comparative Experiment

Figure 3D:
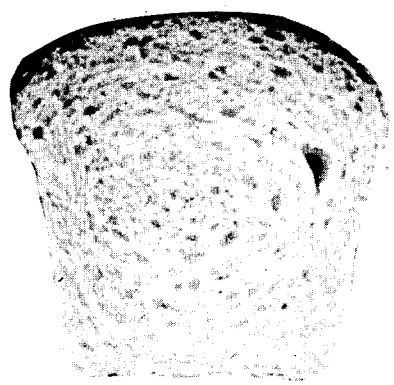

The procedure of part A of this example was repeated with a mix of identical formulation except that the flour was treated with 50 p.p.m. ascorbic acid alone. The resulting loaf was very small in volume, with an irregular shape and other characteristics of an immature loaf. A cross section of the loaf illustrating the coarse texture is shown in the photograph of FIG. 3D in the accompanying drawings.

Part D

Comparative Experiment

Figure 3E:
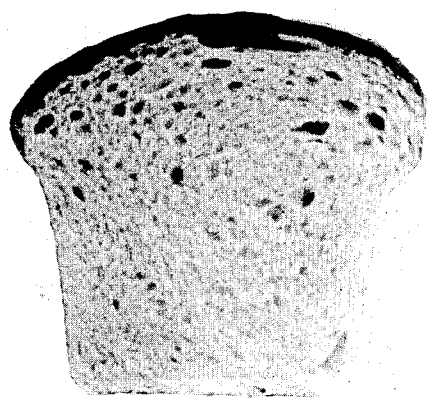

The procedure of part A of this example was repeated with a mix of identical formulation except that the flour was treated with 50 p.p.m. potassium bromate alone. The resulting loaf was very small in volume, with an irregular shape and other characteristics of an immature loaf. A cross section of the loaf illustrating the coarse texture is shown in the photograph of FIG. 3E in the accompanying drawings.

Part E

Comparative Experiment

Figure 3F:
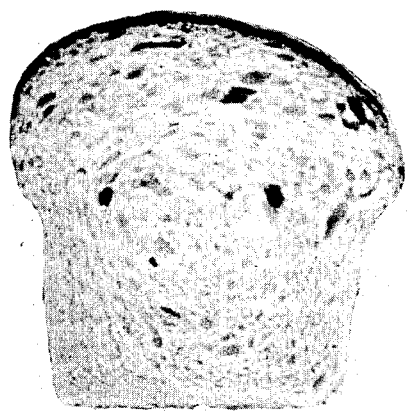

The procedure of part A of this example was repeated with a mix of identical formulation except that the cysteine hydrochloride was omitted, i.e. the flour was treated with 50 p.p.m. ascorbic acid and 50 p.p.m. potassium bromate. The resulting loaf was small in volume with an irregular shape and other characteristics of an immature loaf attributable to inadequate development. A cross section of the loaf illustrating the coarse texture is shown in the photograph of FIG. 3F in the accompanying drawings.

Part F

Comparative Experiment

Figure 3G:
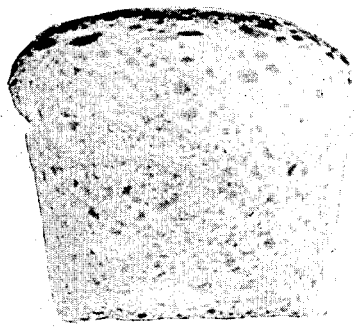

The procedure of part A of this example was repeated with a mix of identical formulation except that the flour was treated with 75 p.p.m. cysteine hydrochloride alone. The resulting loaf was very small in volume, with an irregular shape and other characteristics of an immature loaf. A cross section of the loaf illustrating the coarse texture is shown in the photograph of FIG. 3G in the accompanying drawings.

A comparison between the loaf of part A and the loaves of parts C to F of this example, demonstrates that an acceptable product is obtained only when ascorbic acid, potassium bromate and cysteine hydrochloride are used in combination.

EXAMPLE 4

Different Levels of Additive Components

Bread was prepared from dry mixes containing flour treated with combinations of three additives: ascorbic acid, potassium bromate, and cysteine hydrochloride at different levels of treatment. The mixes also contained 3.3 percent sugar, 3.3 percent salt, 2.0 percent milk solids and 1.3 percent shortening, all based on the flour weight. In making the bread, 12 g. of dry yeast for each 2 loaves were used. 6¼ cups of dry mix and 2½ cups water prepared two loaves. Kneading of the dough before fermentation was completely omitted, so that the procedure only involved mixing the dough with a spoon, subjecting this mass of dough to 30 minutes of fermentation in a warm, humid oven, rolling the dough for 1 minute to render it homogeneous, shaping and panning the loaves, proofing for a total of 60 minutes and baking for 30 minutes at 400° F.

The results in table II below show the effectiveness of the combination of the three additives at various levels.

TABLE II

| Additive levels | | | Specific volume (cc./g.) | Other characteristics |
|---|---|---|---|---|
| Ascorbic acid | Potassium bromate | Cysteine hydrochloride | | |
| 20 p.p.m. | 15 p.p.m. | 45 p.p.m. | 4.1 | Immature, lumpy crust. |
| 20 p.p.m. | 35 p.p.m. | 75 p.p.m. | 4.3 | Very slightly immature, good volume & texture. |
| 35 p.p.m. | 35 p.p.m. | 60 p.p.m. | 4.5 | Mature, excellent volume, appearance & texture. |
| 50 p.p.m. | 50 p.p.m. | 75 p.p.m. | 4.5 | Mature, excellent appearance & texture. |
| 65 p.p.m. | 65 p.p.m. | 90 p.p.m. | 4.4 | Mature, good volume, appearance & texture. |

EXAMPLE 5

Bread Mix—No Fermentation Procedure

A dry mix of formulation similar to that of example 4, except that the flour was treated with 50 p.p.m. of ascorbic acid, 50 p.p.m. of potassium bromate and 75 p.p.m. of cysteine hydrochloride was used. Twelve g. of dry yeast were used for two loaves made from 5½ cups of mix. The procedure was as follows:

Yeast was dissolved in ¼-cup warm water (105°–115° F.) along with 1 teaspoon sugar. This was set aside to stand for 15 minutes. The dissolved yeast was mixed into 1¼ cups lukewarm water and half of the dry mix was added until it was no longer possible to mix the dough by hand. The dough was turned out onto a board and the remaining dry mix was kneaded in. The total kneading time was 7 minutes. The dough was divided into two pieces of equal weight, and the loaves were shaped and placed in two greased 8½ ×4½ ×2½ inch loaf pans. These were placed in a humid oven and allowed to rise for 60 minutes. One loaf, A, was baked at 400° F. for 35 minutes. The other loaf, B, was removed from the humid oven and left to stand on a counter at room temperature for an additional 15 minutes. It was then baked at 400° F. for 35 minutes. The results are shown in the table below.

TABLE III

| Loaf | Specific volume (cc./g.) | Other characteristics |
|---|---|---|
| A | 4.5 | Good volume, appearance and texture. |
| B | 5.1 | Excellent volume, appearance and texture. |

EXAMPLE 6

No Kneading Procedure

Bread was prepared from prepared dry mixes by a procedure which eliminated hand kneading of the dough during dough preparation. The dry mix was simply added to the water containing the dissolved yeast, and the dough stirred with a spoon until a fairly uniformly wetted dough ball was obtained which was then subjected to 30 minutes' fermentation in a humid oven at 85° to 100° F., followed by removal of the dough from the bowl, and shaping into loaves by normal procedures. The loaves were proofed for 45 minutes at 85° to 100° F. prior to baking at 400° F. for 35 minutes. Experiments showed that the preliminary fermentation step for around 30 minutes was required with the formulation involved in this example when kneading was omitted.

Formula

The following basic formula was used for the loaves baked by this procedure:

| Ingredients | Content |
|---|---|
| Flour | 100% |
| Sugar | 5% (of flour weight) |
| Shortening | 3.5% (of flour weight) |
| Salt | 2.5% (of flour weight) |
| Skim milk solids | 2.0% (of flour weight) |

Loaf 6A was made with 14 oz. of mix, 1 cup of water and 8 g. of dry yeast. This dough contained a commercially available all-purpose flour treated with conventional oxidative improvers, and therefore constitutes a further comparison of the present art with that of the invention.

Loaf 6B was made with 14 oz. of mix, 1 cup of water and 6 g. of dry yeast. The flour was similar in characteristics to that of 6A, except that it was treated with 50 p.p.m. of ascorbic acid, 50 p.p.m. of potassium bromate and 75 p.p.m. of cysteine hydrochloride.

Loaf 6C was made with 14 oz. of mix, 1 cup of water and 8 g. of dry yeast. This flour was treated exactly like the flour of 6B.

Properties of the three loaves are presented in the table below.

TABLE IV

| Loaf | Yeast level | Specific volume (cc./g.) | Other characteristics |
|---|---|---|---|
| 6A | 8 g. | 3.7 | Irregular shape, torn shred, thick cell walls, immature. |
| 6B | 6 g. | 4.5 | Mature, normal shape, excellent volume, appearance and texture. |
| 6C | 8 g. | 4.4 | Mature, normal shape, excellent volume, appearance and texture. |

These results show that excellent homemade bread can be prepared by procedures involving no kneading, and much-reduced fermentation times, when the flour contains a three-component additive composition of the sort described herein.

EXAMPLE 7

Hot Roll Mix

A prepared dry mix of the following formulation is designed to produce sweet doughs suitable for fancy breads, rolls, buns coffee cakes, etc. The method used to prepare the bread from this mix is given below. A control mix of equivalent formulation but omitting the flour treatment additive composition was also prepared and processed in the same manner.

Formula:

| Ingredient | Content |
|---|---|
| Top Patent flour | 100% |
| Ascorbic acid | 50 p.p.m. |

| | |
|---|---|
| Potassium bromate | 50 p.p.m. |
| Cysteine hydrochloride | 75 p.p.m. |
| Sugar | 8.75% of flour weight |
| Salt | 3.1% of flour weight |
| Shortening | 3.75% of flour weight |
| Skim mild solids | 2.2% of flour weight |
| Monocalcium phosphate | 0.06% of flour weight |

Dough was prepared from 14 oz. of mix, one egg, 6 g. of dry yeast and three-fourths cup of water.

Procedure

The yeast was dissolved in ¾-cup warm water (105°–115° F.). One egg, and 14 oz. of dry mix were added to the liquid, the whole mixture was mixed with a spoon until a ball of dough was formed. The ball of dough contained in the mixing bowl was placed in a warm and humid oven (85°–90° F.) to rise for 30 minutes prior to proofing at 85° F. for 60 minutes and baking at 400° F. for 35 minutes to give a loaf (7A). The same procedure was followed with the control mix based on conventionally treated flour. The results are presented in the table below.

TABLE V

| Loaf | Specific volume | Other characteristics |
|---|---|---|
| | (cc./g.) | |
| 7A | 4.5 | Excellent volume, appearance and texture. |
| Control | 3.3 | Irregular shape, immature. |

EXAMPLE 8

Hot Roll Mix

The same mix as described in example 7 was used to prepare a variety of hot roll products, such as fancy rolls, cinnamon buns, plain rolls, coffee rings, etc., by methods involving no kneading of the dough. it was found that the proofing or final rising time could be decreased to 30 to 40 minutes for such products. Excellent volumes, appearance and structure were obtained, the products generally being larger than those produced by conventional methods.

EXAMPLE 9

Whole Wheat Bread Mix

Two whole wheat bread mixes were prepared, of the following formulations, and made into bread by the procedure of example 3, part A.

Formulation 9A

| Ingredient | Content |
|---|---|
| Bakers Patent flour | 100 g. |
| Ascorbic acid | 50 p.p.m. |
| Potassium bromate | 50 p.p.m. |
| Cysteine hydrochloride | 75 p.p.m. |
| Reground bran | 20 g. |
| Shortening | 3.6 g. |
| Sugar | 6.0 g. |
| Salt | 3.0 g. |
| Skim milk powder | 2.4 g. |

Bread was prepared from 14 oz. of dry mix, 6 g. of active dry yeast and 1 cup of water.

Formulation 9B

Fifty percent by weight of formulation 9A and 50 percent by weight of the following formulation were combined to yield composition 9B.

| Ingredients | Content |
|---|---|
| Top Patent flour | 100 g. |
| Ascorbic acid | 50 p.p.m. |
| Potassium bromate | 50 p.p.m. |
| Cysteine hydrochloride | 75 p.p.m. |
| Shortening | 3 g. |
| Sugar | 5 g. |
| Salt | 2.5 g. |
| Skim milk powder | 2 g. |

Bread was prepared from 14 oz. of dry mix, 6 g. of active dry yeast and 1 cup of water. The results are presented in the table below.

TABLE VI

| Example | Specific volume | Other characteristics |
|---|---|---|
| | (cc./g.) | |
| 9A | 94.6 | Excellent flavor, structure and grain. |
| 9B | 4.3 | Excellent flavor, structure and grain. |

EXAMPLE 10

Cracked Wheat Bread

A prepared dry mix suitable for preparation of Cracked Wheat Bread, of the following formulation, was used to make bread by the procedure of example 3, Part A.

Formulation:

| Ingredient | Content |
|---|---|
| Bakers Patent flour | 100 g. |
| Ascorbic acid | 50 p.p.m. |
| Potassium bromate | 50 p.p.m. |
| Cysteine hydrochloride | 75 p.p.m. |
| Cracked wheat | 20 g. |
| Shortening | 3.6 g. |
| Sugar (dark brown) | 7.5 g. |
| Sugar (white) | 1.5 g. |
| Salt | 2.7 g. |
| Skim milk powder | 2.4 g. |

Bread was prepared from 14 oz. of dry mix, 6 g. of active dry yeast and 1 cup of water.

The resulting loaf had a specific volume of 4.0, a good structure, texture, flavor and appearance.

The preceding discussion read in conjunction with the examples demonstrates that applicants have succeeded in preparing a variety of dry mix formulations suitable for packaging for sale to the housewife. In the majority of instances, the housewife will simply add water to the mix for the purpose of preparing a dough ball which, often with the elimination of any preliminary fermentation step, will simply be kneaded, formed into loaves, buns or rolls, proofed and baked. In contrast with dry mixes hitherto available for homebaking applications, the dry mixes provided by this invention are convenient to use, they reduce labor and shorten the time involved in the preparation of homemade, yeast-raised products. The products obtained from such mixes are highly acceptable to persons both familiar and unfamiliar with homemade, yeast-raised goods of good quality, taste, texture and flavor.

In summary, the flour-based, dry baking mixes of this invention, when combined in a suitable quantity with water and yeast, and used according to prescribed procedures, greatly facilitate the preparation of yeast-raised products in the home within much shorter periods of time and more conveniently than hitherto normal.

What we claim is:

1. A blended packageable dry mix for mixing with water and yeast in the homebaking of yeast-raised products comprising a homogeneous blend of flour, sugar, shortening, salt and an additive composition containing, in parts per million based on flour weight, 20 to 100 parts of edible ascorbate compound, 20 to 75 parts of a nonascorbate edible oxidizing agent, and 15 to 100 parts of an edible sulfhydryl-containing reducing agent.

2. A blended, packageable dry mix as claimed in claim 1, which comprises a homogeneous blend including 70 to 90 percent flour, 2 to 10 percent sugar, 1 to 3 percent shortening and an additive composition containing, in parts per million based on flour weight, 20 to 100 parts of ascorbic acid, 20 to 75 parts of potassium bromate and 15 to 100 parts of cysteine hydrochloride.

3. A blended, packageable dry mix as claimed in claim 1, wherein the additive composition contains, in parts per million based on flour weight, 25 to 75 parts of ascorbic acid, 25 to 65 parts of potassium bromate and 40 to 90 parts of cysteine hydrochloride.

4. A package containing the blended, dry mix of claim 1.

5. A method of making home-bake products from yeast-raised dough which comprises blending a water suspension of yeast with a mix comprising a homogeneous blend including 70 to 90 percent flour, 2 to 10 percent sugar, 1 to 3 percent salt, the equivalent of 0 to 5 percent milk solids, 0 to 8 percent shortening and an additive composition containing, in parts per million based on flour weight, 20 to 100 parts of an edible ascorbate compound, 15 to 100 parts of an edible sulfhydryl-containing reducing agent and 20 to 75 parts of a nonascorbate edible oxidizing agent, to form a dough mass, kneading the dough for over 4 minutes and, with the omission of an intervening preliminary fermentation period, forming the dough into at least one loaf, proofing the loaf or loaves for a period of up to about 75 minutes, and then baking the loaf or loaves.

6. A method as claimed in claim 5, wherein the dough is kneaded for a period between about 4 minutes and about 8 minutes.

7. A method as claimed in claim 5, wherein the additive composition contains, in parts per million based on flour weight 25 to 75 parts ascorbic acid, 25 to 65 parts potassium bromate and 40 to 90 parts cysteine hydrochloride.

8. A method of making home-baked products from yeast-raised dough which comprises blending a water suspension of yeast with a mix comprising a homogeneous blend including 70 to 90 percent flour, 2 to 10 percent sugar, 1 to 3 percent salt, the equivalent of 0 to 5 percent milk solids, 0 to 8 percent shortening and an additive composition containing, in parts per million based on flour weight, 20 to 100 parts of ascorbic acid, 15 to 100 parts of a sulfhydryl-containing reducing agent and 20 to 75 parts of a nonascorbate edible oxidizing agent, to form a dough mass, kneading the dough for 0 to 4 minutes, fermenting the dough for about 15 to 60 minutes, forming the dough into at least one loaf, proofing the loaf or loaves for a period of up to about 75 minutes, and then baking the loaf or loaves.

9. A method as claimed in claim 8, wherein the dough is fermented for about 30 to about 45 minutes without first being kneaded.

10. A method as claimed in claim 8, wherein the dough is kneaded for about 1 to about 4 minutes and then fermented for about 30 to about 45 minutes.

11. A method as claimed in claim 8, wherein the additive composition contains, in parts per million based on flour weight, 25 to 75 parts ascorbic acid, 25 to 65 parts potassium bromate and 40 to 90 parts cysteine hydrochloride.

12. An activated flour for use with conventional dough-making ingredients in the preparation of home-baked, yeast-raised products which comprises flour and an additive composition containing, in parts per million based on flour weight, 20 to 100 parts of an edible ascorbate compound, 20 to 75 parts of a nonascorbate edible oxidizing agent, and 15 to 100 parts of an edible sulfhydryl-containing reducing agent.

13. The method of rapidly increasing dough viscosity and of reducing the mixing time to 2 to 4 minutes maximum, to the virtual elimination of preliminary fermentation or hand kneading, comprising preparing a dough by hand blending water and a yeast slurry with a homogeneous dry mixture of ingredients including flour, sugar, salt and milk solids, the flour containing, in parts per million based on flour weight, 25 to 75 parts ascorbic acid, 25 to 65 parts potassium bromate and 40 to 90 parts of cysteine hydrochloride, hand kneading or fermenting the dough forming the dough into loaves, and proofing and baking the loaves.

* * * * *